(12) United States Patent
Andriessen et al.

(10) Patent No.: US 6,245,494 B1
(45) Date of Patent: Jun. 12, 2001

(54) METHOD OF IMAGING A HEAT MODE RECORDING ELEMENT COMPRISING HIGHLY DISPERSED METAL ALLOYS

(75) Inventors: Hieronymus Andriessen, Beerse; Steven Lezy, Antwerp; Luc Leenders, Herentals, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/348,280

(22) Filed: Jul. 7, 1999

Related U.S. Application Data

(60) Provisional application No. 60/104,739, filed on Oct. 19, 1998.

(30) Foreign Application Priority Data

Aug. 27, 1998 (NL) .................................................. 98202899

(51) Int. Cl.$^7$ ..................................................... G03C 5/00
(52) U.S. Cl. .............. 430/346; 430/270.11; 430/270.12; 430/945
(58) Field of Search ........................ 430/270.11, 270.12, 430/346, 945; 75/351, 370, 371, 373

(56) References Cited

U.S. PATENT DOCUMENTS

| | | | |
|---|---|---|---|
| 4,007,072 | | 2/1977 | Aonuma et al. . |
| 4,496,957 | * | 1/1985 | Smith et al. ....................... 346/135.1 |
| 4,596,722 | | 6/1986 | Warszawski . |
| 5,034,292 | * | 7/1991 | Gilmour et al. .......................... 430/3 |
| 5,034,313 | * | 7/1991 | Shuman ................. 430/616 |
| 5,055,380 | * | 10/1991 | Bertucci et al. ..................... 430/346 |
| 5,435,830 | | 7/1995 | Senda et al. . |
| 5,801,318 | * | 9/1998 | Tani et al. .............................. 75/373 |

FOREIGN PATENT DOCUMENTS

| | | |
|---|---|---|
| 0 176 760 A2 | 4/1986 | (EP) . |
| 0 361 204 A2 | 4/1990 | (EP) . |
| 0 361 204 A3 | 4/1990 | (EP) . |
| 1 272 325 | 4/1972 | (GB) . |

\* cited by examiner

*Primary Examiner*—John A. McPherson
(74) *Attorney, Agent, or Firm*—Breiner & Breiner

(57) ABSTRACT

Colloidal metal alloy compositions are prepared by chemical reduction of mixtures of at least two types of metal ions in an aqueous medium. Coating such a composition onto a support provides heat mode recording elements with improved sensitivity to laser radiation.

13 Claims, No Drawings

METHOD OF IMAGING A HEAT MODE RECORDING ELEMENT COMPRISING HIGHLY DISPERSED METAL ALLOYS

This application is based on provisional application Ser. No. 60/104,739 filed Oct. 19, 1998.

FIELD OF THE INVENTION

The present invention relates to a simple method for the preparation of highly dispersed metal alloys and to an application of such alloys into a heat mode recording film.

BACKGROUND OF THE INVENTION

Methods for the preparation of nanoparticle metal and metal oxide colloidal dispersions (or hydrosols) are well known in the art. They include, but are not limited to, (1) the synthesis of colloidal dispersions of various transition metals in aqueous media, stabilized by added polymers as protective colloids (Bawendi et al., *Annu. Rev. Phys. Chem.* (1990), 41, p. 477); the synthesis of ultrasmall metal oxide particles by the combination of water and metal chloride, hydroxides, or acetates, in aqueous media (Henglein, *Top. Curr. Chem.* (1988), 143, p.113); the synthesis of Ag nanoparticles by the reduction of $Ag^+$ in aqueous media (Wang et al., *J. Phys. Chem.* (1991), 95, p. 525); the formation of colloidal silver and gold in aqueous media by ultrasonic radiation (Hoffman et al., *J. Phys. Chem.* (1992), 96, p.5546; the formation of colloidal gold in aqueous media by the reduction of a gold salt (Colvin et al., *Nature* (1994), 370, p.354); the formation of colloidal platinum and palladium in aqueous media by synthetic routes analogous to those for preparing gold colloids (Heath et al., *Appl. Phys. Lett.* (1994), 64, p.3569). Layers containing colloidal silver are used for long time as filter layers in photographic colour materials.

In WO 97/24224 a method involving reduction is disclosed for the preparation of organically functionalized nanoparticles of metals and metal alloys. For instance, organically functionalized Co—Au alloys can be prepared by this method. In ES 2083309 the preparation by reduction in a medium of micromulsions of ultrafine particles of alloys and magnetic oxides is disclosed. Both teachings cited above show the disadvantage of being cumbersome and of requiring the use of organic solvents.

As disclosed in *J. Am. Chem. Soc.* (1991), Vol. 113, nanoscale metal particles and mixtures thereof are prepared by reduction in an aprotic organic solvent.

According to U.S. Pat. No. 5,620,584 metals and metal alloys can be prepared by electrochemical reduction.

In pending European patent application, appl. No. 98201117 a process is disclosed for the preparation of a particular heat mode recording element involving the coating from an aqueous medium of a layer containing highly dispersed metal particles.

Heat mode recording materials are capable of producing an image by the transformation of image-wise applied laser light into a corresponding heat pattern. Different types exist according to their composition.

In a particular type of heat mode elements, e.g. as disclosed in EP 0 674 217, density is generated by imagewise chemical reduction of organic metal salts, preferably silver salts such as silver behenate, without the presence of catalytic amounts of exposed silver halide such it is the case in the dry silver system.

Another important category of heat mode recording materials is based on change of adhesion, e.g. as disclosed in U.S. Pat. Nos. 4,123,309, 4,123,578, 4,157,412, 4,547,456 and PCT publ. Nos. WO 88/04237, WO 93/03928, and WO 95/00342.

In still another particular type of thermal recording or heat mode recording materials information is recorded by creating differences in reflection and/or in transmission on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of metals, dyes, or polymers. Recording materials like this are described in "Electron, Ion and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550. Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously). Recording materials of this type are called "direct read after write" (DRAW) materials. DRAW recording materials can be used as a medium for recording an imagewise modulated laser beam to produce a human readable or machine readable record. Human readable records are e.g. micro images that can be read on enlargement and projection. An example of a machine readable DRAW recording material is the optical disc. To date for the production of optical discs tellurium and its alloys have been used most widely to form highly reflective thin metal films wherein heating with laser beam locally reduces reflectivity by pit formation (ref. e.g. the periodical 'Physik in unserer Zeit', 15. Jahrg. 1984/Nr. 5, 129–130 the article "Optische Datenspeicher" by Jochen Fricke). Tellurium is toxic and has poor archival properties because of its sensitivity to oxygen and humidity. Other metals suited for use in DRAW heat-mode recording are given in U.S. Pat. No. 4,499,178 and U.S. Pat. No. 4,388,400. To avoid the toxicity problem other relatively low melting metals such as bismuth have been introduced in the production of a heat-mode recording layer. By exposing such a recording element very shortly by pulses of a high-power laser the writing spot ablates or melts a small amount of the bismuth layer. On melting the layer contracts on the heated spot by surface tension thus forming small cavitations or holes. As a result light can pass through these cavitations and the density is lowered to a certain Dmin value.

According to EP 0 384 041 a process is provided for the production of a heat mode recording material having "direct read after write" (DRAW) possibilities wherein a web support is provided with a heat mode recording thin metal layer, preferably a bismuth layer, characterized in that in the same vacuum environment a protective organic resin layer in web form is laminated to said supported recording layer by means of an adhesive layer.

A commercially available material manufactured according to the principles of cited EP 0 384 041 is MASTER-TOOL MT8, registered trade name, marketed by Agfa-Gevaert N.V.

A drawback of the method of preparation of a thin bismuth recording layer by vacuum deposition is the fact that this is a complicated, cumbersome and expensive process. Therefore, in pending European patent application appl. No. 98201117, cited above, an alternative process for applying a thin metal layer is described comprising the following steps:

(1) preparing an aqueous medium containing ions of a metal, (2) reducing said metal ions by a reducing agent thus forming metal particles, (3) coating said aqueous medium containing said metal particles on said transparent support.

In a preferred embodiment the metal layer is again a bismuth layer. However, such bismuth layers coated from an aqueous medium suffer in their turn from another drawback. Compared to bismuth layers prepared by vacuum deposition their sensitivity to laser light is lower. This is due to the presence of a higher degree of oxidized bismuth, and to the presence of ballast compounds in the layer such as a binder and additives improving stability, which to a certain degree hamper the formation of microspheres by the action of laser radiation.

OBJECTS OF THE INVENTION

It is the first object of the present invention to provide a simple method for the preparation of colloidal metal alloy compositions.

It is a second object of the present invention to provide a method for the preparation of a heat mode recording element of the thin metal layer type with improved sensitivity.

SUMMARY OF THE INVENTION

The first object of the present invention is realized by providing a process for the preparation of a colloidal metal alloy composition of at least two metals, characterized in that said process comprises the following steps:

(1) preparing an aqueous medium containing at least two different types of metal ions, belonging to a group chosen from the groups I B, II B, III A, IV A, and V A from the periodic system of elements, (2) chemically reducing said metal ions by a reducing agent.

In most of the cases, this will cause a lower melting point or melting range, if compared to the melting points of the individual metals.

The second object of the present invention is realized by coating said colloidal metal alloy composition onto a substrate.

These and other objects will become clear from the description hereinafter.

DETAILED DESCRIPTION OF THE INVENTION

The preparation of the colloidal metal alloy composition according to the present invention will now be explained in detail on the hand of a preferred embodiment wherein the alloy consists of bismuth and tin.

In a first step an aqueous solution of bismuth ions and tin ions is prepared. As most suitable bismuth salt bismuth nitrate can be chosen. A suitable tin salt is tin chloride.

The phase diagram of the Bi—Sn system (Stoffel A.: Z. an. Chem. 53 (1907) p147) shows an eutectic point for 42% of Bi and 58% of Sn; the melting point of this alloy is 139° C. According to this phase diagram, BiSn alloys with compositions varying between 98% Bi/2% Sn and 19% Bi/81% Sn will start their melting range at 139° C. As will be illustrated by the examples further on it is particularly advantageous to choose a ratio of bismuth ions and tin ions for which an alloy composition in the region of the eutectic composition will be obtained. Due to differences in reduction kinetics for Bi and Sn, the ratio of the ions used for the reduction will not exactly be equal to the ratio of the two metals found in the alloy. This difference depends on the difference in kinetics and can be minimized by adjusting the reduction parameters like excess of reductor, pH, complexing agents, etc.

In order to maintain a sufficient amount of both ions in solution, it will often be necessary to add a complexing agent. A preferred complexant is simply the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N,N,N',N'-tetraacetic acid (CDTA), ethyleneglycol-O,O'-bis(2-aminoethyl)-N,N,N', N'-tetraacetic acid (EGTA), N-(2-hydroxyethyl) ethylenediamine-N,N,N'-triacetic acid (HEDTA), etc.

In a following step the bismuth and tin ions in the solution are reduced to highly dispersed bismuth-tin alloy particles by means of the addition of a reducing agent. A preferred reducing agent is sodium hyposulphite. Another suitable reducing agent is $KBH_4$. Others include glucose, formaldehyde. The reducing agent can be added to the original bismuth+tin salt solution as a solid powder. On the other hand the reducing agent can be dissolved separately in a second aqueous medium and added to the bismuth-tin salt solution according to a single jet or a double jet procedure. Preferably, according to the double jet principle, the aqueous medium containing the different metal ions and the second solution containing the reducing agent are added together to a third aqueous medium.

In order to keep the metal alloy particles formed by reduction in colloidal dispersion a protective binder is preferably added to one or more of the three aqueous solutions involved. Preferably, this protective binder is added to the third aqueous medium wherein both others are jetted. A particularly preferred protective binder is carboxymethylcellulose (CMC), preferably of the high viscosity type. Other possible binders include gelatin, arabic gum, poly(acrylic acid), cellulose derivatives and other polysaccharides.

When the reduction is substantially completed the aqueous medium can directly be coated on a support but more preferably the superfluous salts are first removed from the aqueous medium by a washing process, preferably involving ultrafiltration and/or diafiltration and/or by centrifugation. In any of the solutions involved in the preparation a so-called dispersing aid can be present. In a preferred embodiment this compound is added to the diafiltration liquid at the last stage of the preparation. Suitable dispersing aids in the case of bismuth and tin are pyrophosphates, more particularly a hexametaphosphate such as sodium hexametaphosphate. Probably, the hexametaphosphate adsorbs to the surface of the alloy particles so that they become negatively charged. By electrostatic repulsion they are kept in dispersion. Also the phosphate inhibits further oxidation of the surface of the formed nanoparticles. So in a preferred embodiment the Bi—Sn alloy particles are ultrafiltrated e.g. through a Fresenius F60 cartridge and subsequently diafiltrated against a solution of sodium hexametaphosphate in water/ethanol (98.5/1.5).

In the final aqueous medium preferably an anti-oxidant, added at any stage of the preparation, such as ascorbic acid or a derivative thereof is present in order to avoid further oxidation of the metals.

The present invention has been explained on the hand of a preferred embodiment wherein the metal alloy is composed of bismuth and tin but must not be construed as being limited thereto as long as the metals belong to the Periodic Table groups as defined above. Other useful metals which can be involved in alloy formation include for instance Be, Mg, Ca, Sr, Ba, La, Ce, Cu, Ag, Au, Zn, Cd, Hg, Al, Ga, Tl, Ge, Pb, As, Sb, S, Se, Te, Po.

In addition to bismuth/tin other most preferred alloys prepared in accordance with the present invention are bismuth/lead and bismuth/tin/indium alloys.

In a particularly useful but not limiting application, belonging to the scope of the present invention the colloidal metal alloy composition is incorporated in the image forming layer of a heat mode recording element. Preferably after the addition of one or more coating agents the obtained final colloidal composition is coated on the substrate by means of a conventional coating technique, such as slide hopper, curtain coating and air-knife coating.

Suitable coating agents include non-ionic agents such as saponins, alkylene oxides e.g. polyethylene glycol, polyethylene glycol/polypropylen glycol condensation products, polyethylene glycol alkyl esters or polyethylene glycol alkylaryl esters, polyethylene glycol esters, polyethylene glycol sorbitan esters, polyalkylene glycol alkylamines or alkylamides, silicone-polyethylene oxide adducts, glycidol derivaties, fatty acid esters of polyhydric alcohols and alkyl esters of saccharides; anionic agenst comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as aklylamine salts, aliphatic, aromatic, or heterocyclic quaternary ammonium salts, aliphatic or heterocyclic ring-containing phosphonium or sulphonium salts. Other suitable surfactants include perfluorinated compounds.

Useful transparent organic resin supports include e.g. cellulose nitrate film, cellulose acetate film, polyvinylacetal film, polystyrene film, polyethylene terephthalate film, polycarbonate film, polyvinylchloride film or poly-$\alpha$-olefin films such as polyethylene or polypropylene film. The thickness of such organic resin film is preferably comprised between 0.05 and 0.35 mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅕ or more and increasing its area 2 to 9 times. The stretching may be accomplished in two stages, transversal and longitudinal in either order or simultaneously. The subbing layer, when present, is preferably applied by aqueous coating between the longitudinal and transversal stretch, in a thickness of 0.1 to 5 mm. In case of a bismuth recording layer the subbing layer preferably contains, as described in EP 0 464 906, a homopolymer or copolymer of a monomer comprising covalently bound chlorine. Examples of said homopolymers or copolymers suitable for use in the subbing layer are e.g. polyvinyl chloride; polyvinylidene chloride; a copolymer of vinylidene chloride, an acrylic ester and itaconic acid; a copolymer of vinyl chloride and vinylidene chloride; a copolymer of vinyl chloride and vinyl acetate; a copolymer of butylacrylate, vinyl acetate and vinyl chloride or vinylidene chloride; a copolymer of vinyl chloride, vinylidene chloride and itaconic acid; a copolymer of vinyl chloride, vinyl acetate and vinyl alcohol, etc. Polymers that are water dispersable are preferred since they allow aqueous coating of the subbing layer which is ecologically advantageous.

Alternative supports are opaque supports and glass, e.g. thin glass packed on roll.

Preferably the coated metal alloy layer is covered by a protective layer or layer pack. Three types of protective elements are preferred.

In a first preferred particular embodiment this protective element comprises a transparent organic resin, acting as outermost cover sheet, and an adhesive layer. The adhesive layer can be of the pressure-adhesive type or of the thermoadhesive type. Examples of pressure-adhesive resins are described in U.S. Pat. No. 4,033,770 for use in the production of adhesive transfers (decalcomanias) by the silver complex diffusion transfer process, in the Canadian Patent 728,607 and in the U.S. Pat. No. 3,131,106. When the adhesive layer is of the heat-activatable, also called thermoadhesive type, the adhesive layer is preferably applied on top of the metal layer by lamination together with the resin foil to which it is preliminary applied by coating. The exterior resin foil can be chosen from the group of polymeric resins usable for the support of the heat mode element. In a preferred embodiment the cover sheet is also polyethylene terephthalate but preferably substantially thinner (about 10 $\mu$m) than the polyethylene terephthalate of the support.

A survey of pressure and/or heat-sensitive adhesives is given by J. Shields in "Adhesives Handbook", 3rd. ed. (1984), Butterworths—London, Boston, and by Ernest W. Flick in "Handbook of Adhesive Raw Materials" (1982), Noyens Publications, Park Ridge, N.J.—USA.

More recent reviews on adhesives include Creton, "Material science of pressure-sensitive adhesives", *Fr. Mater. Sci. Technol.* (1997), 18, p. 707 ; Baghdachi, "Fundamentals of adhesion", *J. Coat. Technol.* (1997), 69 (870), p. 85 ; Clemens, "The developing chemistry of pressure sensitive adhesives", *Proc. Ann. Meet. Adhes. Soc.* (1997), 20th, p. 351.

In a second preferred type of protective layer pack two layers are coated on top of the metal layer, a soft polymeric layer and an outermost hard polymeric layer. Combinations of useful compositions for the soft and the hard polymeric layers are described in Europen patent application appl. No. 98201117, cited above.

A third type of protective element consists of just one layer which, due to the presence of a reactive monomer, is radiation-curable, preferably UV-curable. Protective elements of this type are disclosed in pending European patent application appl. No. 97203857.

For the formation of a heat mode image using the element of the present invention any laser can be used which provides enough energy needed for the production of sufficient heat for this particular process of image formation. In a preferred embodiment a powerful infra-red laser is used, most preferably a Nd—YLF laser or diode laser.

In the most preferred embodiment of the present invention the concentration ratio of the different metal ion types is chosen so that after reduction the percentual composition of the alloy obtained is situated in the neighbourhood of the eutectic composition and therefore has a lower melting point than the individual metals. For example, the melting point for pure bismuth is 271° C., and for pure tin it is 232° C., while the melting point for the Bi—Sn alloy having the eutectic 42/58 composition is 139° C. This means that considerably less laser energy is needed for image formation in the case of a heat mode recording element based on Bi—Sn alloy than in the case of an element based on pure Bi. In other words, the element comprising the alloy has a higher sensitivity.

The present invention will now be illustrated by the following examples without however being limited thereto.

EXAMPLES

Example 1

This example shows that dispersed BiSn alloy nanoparticles can be formed in a purely chemical way. It is also shown that an improvement in sensitivity can be obtained if an alloy with a lower melting temperature is used in a heat mode laser sensitive film, based on coated nanoparticles of a metal or metal alloy.

The following solutions were prepared:

| Solution 1 | |
|---|---|
| Water | 400 ml |
| Bi (NO$_3$)$_3$ · 5H$_2$O | α × 449 g |
| SnCl$_4$ · 5H$_2$O | (1-α) × 269 g |
| Triammonium citrate (50% in water) | 1200 ml |
| NH$_3$ (26% in water) (pH = 12) | 300 ml |
| Water to | 2330 ml |
| Solution 2 | |
| Water | 1375 ml |
| NH$_3$ (26% in water) (pH = 12) | 2 ml |
| KBH$_4$ | 28 g |
| Solution 3 | |
| Water | 1300 ml |
| NH$_3$ (26% in water) (pH = 12) | 10 ml |
| KBH$_4$ | 47 g |
| Solution 4 | |
| Water | 1136 ml |
| Carboxymethylcellulose (3% in water) | 104 ml |

The samples, with different values for a according to table 1, were prepared as follows:

To solution 4, held at 40° C. and stirred at 450 rpm, solution 1 at a flow rate of 200 ml/min was added simultaneously with solution 2 or 3 at 117 ml /min according to table 1. After the reduction, the bismuth, tin or bismut/tin alloy dispersion was ultrafiltrated through a Fresenius F60 cartridge and diafiltrated with a 0.2% solution of sodium hexametaphosphate in water/ethanol (98.5/1.5).

The dispersion was stirred and 10 ml of a 12.5% solution of Saponine Quillaya (Schmittmann) in water/ethanol (80/20) was added.

The dispersions were analysed for their particle size distribution (weight average d$_{wa}$) with the Disc Centrifuge Photosedimentometer BROOKHAVEN BI-DCP. The results are shown in table 1.

For their melting point/melting range the dispersions were analysed with the differential Scanning Calorimeter SEIKO SSC5200 DSC. According to the literature (Stoffel A.: *Z. an. Chem.* 53 (1907) 147; Mazzotto D.: *Int.Z. Metallogr.* 4 (1913) 273) the eutectic composition of the BiSn alloy corresponds to 42% Bi/58% Sn. Its melting point is 139° C. (pure Bi melts at 271° C. and pure Sn at 232° C.). According to the phase diagram, BiSn-alloys with compositions varying between 98%Bi2%Sn and 19%Bi81%Sn start their melting range at 139° C. The DSC results are shown in table 1.

The characterization with XRD (X-ray diffraction), performed on a film layer of the dispersion supported on a glass plate, showed that the particles were crystalline with diffraction peaks like those of rhombohedral Bi. The XRD pattern corresponds with the number 5-519 of the international databank JCPDS-ICDD. The main reflections were: (012) at 2θ≅approx. 27.2° or d≅approx. 3.28 Å, (104) at 2θ≅approx. 38.0° or d≅approx. 2.37 Å, (110) at 2θ≅approx. 39.7° or d≅approx. 2.273 Å, (202) at 2θapprox. 48.7° or d≅approx. 1.868 Å. The peaks of the dispersion show a shift towards higher 2θ or lower d-values (according to the Bragg law). Also some tetragonal Sn is present but the intensity of the peaks is lower in comparison with the dispersion of Bi and Sn particles separately. The main reflections of Sn were: (200) at 2θ≅approx. 30.7° or d≅approx. 2.915 Å, (101) at 2θ≅approx. 32.1° or d≅approx. 2.793 Å.

TABLE 1

| Sample | a (% Bi/% Sn added) | Reductor | T$_m$ (DSC) | d$_{wa}$ (S$_{wa}$) (nm) |
|---|---|---|---|---|
| Sample 1 (comparison) | 1 (100/0) | Solution 2 | 271° C. | 53 (11) |
| Sample 2 (comparison) | 1 (100/0) | Solution 3 | 271° C. | 58 (9) |
| Sample 3 | 0.85 (85/15) | Solution 2 | 270° C. | 65 (2) |
| Sample 4 | 0.85 (85/15) | Solution 3 | 268° C. | 56 (9) |
| Sample 5 | 0.42 (42/58) | Solution 2 | 264° C. | 44 (8) |
| Sample 6 (invention) | 0.42 (42/58) | Solution 3 | 134° C. | 38 (10) |
| Sample 7 | 0.30 (30/70) | Solution 2 | 266° C. | 31 (7) |
| Sample 8 (invention) | 0.30 (30/70) | Sotution 3 | 133° C. | 33 (8) |
| Sample 9 (comparison) | 0 (0/100) | Solution 3 | 231° C. | 107 (24) |
| Sample 10 (control) = 42% Sample 2 + 58% Sample 9 | — | — | 271° C. & 231° C. | |

In order to demonstrate the advantage of a lower melting alloy in a heat mode laser recordable material some of these dispersions according to table 2 were coated on a substrated PET foil so that a density of 3.5 (Macbeth optical densitometer) was obtained. Thereupon a protective laminate comprising a 8 μm thick pressure-adhesive layer, type DURO-TAK 380-2954, National Starch and Chemical Co., and a 12 μm thick PET foil was laminated by using CODOR LAMIPACKER LPP650.

The exposure was performed by a NdYLF laser emitting at 1064 nm. The image plane power was set between 200 and 450 mW maximum with intervals of 50 mW. A spot size (1/e$^2$) of 16 μm was used together with a pitch of 8 μm at a scan speed of 4.4 m/s. The sensitivity is defined as the energy necessary to obtain a linewith of 8 μm in the image (microscopic evaluation) and is expressed in J/m$^2$ (E = E$_{single\ scan}$). The smaller this number, the more sensitive the film is.

TABLE 2

| Sample | Composition | T$_m$ (DSC) | d$_{wa}$ (S$_{wa}$) (nm) | D$_{min}^{UV}$ | E$_{ss}$ (J/m$^2$) |
|---|---|---|---|---|---|
| Sample 1 (comp.) | Bi | 271° C. | 53 (11) | 0.30 | 4300 |
| Sample 6 (inv.) | BiSn-alloy | 134° C. | 38 (10) | 0.25 | 3700 |
| Sample 9 (comp.) | Sn | 231° C. | 107 (24) | 0.40 | 3850 |

From table 2, it can be observed that lowering the melting point by using an alloy instead of a pure metal can improve the sensitivity and D$_{min}^{UV}$.

Example 2

This example shows that dispersed BiPb alloy nanoparticles can be formed in a pure chemical way.
The following solution was prepared:

| Solution 5 | |
| --- | --- |
| Water | 200 ml |
| $HNO_3$ (conc.) | 22 ml |
| Bi $(NO_3)_3 \cdot 5H_2O$ | 218.6 g |
| Triammonium citrate (50% in water) | 600 ml |
| NaOH (50%) | 102 ml |
| Pb $(OOCCH_3)_2$ | 131.5 g |
| $NH_3$ (26% in water) (pH = 12) | 10 ml |
| Water to | 2500 ml |

The sample was prepared as follows:

To solution 4 (example 1), held at 40° C. and stirred at 450 rpm, solution 5 at a flow rate of 200 ml/min was added simultaneously with solution 3 (example 1) at 117 ml/min. After the reduction, the bismuth/lead dispersion was ultrafiltrated through a Fresenius F60 cartridge and diafiltrated with a 0.2% solution of sodium hexametaphosphate in water/ethanol (98.5/1.5).

The dispersion was stirred and 10 ml of a 12.5% solution of Saponine Quillaya (Schmittmann) in water/ethanol (80/20) was added.

The dispersion was analysed for its particle size distribution with the Disc Centrifuge Photosedimentometer BROOKHAVEN BI-DCP. The results are shown in table 3.

Its melting range was determined with the differential Scanning Calorimeter SEIKO SSC5200 DSC. According to the literature (Barlow, W.: Z. an. Chem. 70 (1911) 183; Tammann, G. & Schimpf H.: Z. Elektrochem. 18 (1912) 595; Solomon, D. & Morris-Jones W.: Phil. Mag. 11 (1931) 1090; Benedicks C.: Z. Metallkd. 25 (1933) 200; Hofe von H. & Hanemann H.: Z. Metallkd. 32 (1940) 112) the eutectic composition of the BiPb alloy corresponds to 56% Bi/44% Pb, which was used for the preparation of our dispersion. Its melting point is 125.5° C. (pure Bi melts at 271° C. and pure Pb at 327° C.). According to the phase diagram, BiPb alloys with compostions varying between 97% Bi/3% Pb and 42% Bi/58% Pb start their melting range at 125.5° C. The DSC results are shown in table 3.

TABLE 3

| Sample | (% Bi/% Pb added) | Reductor | $T_m$ (DSC) | $d_{wa}$ ($S_{wa}$) (nm) |
| --- | --- | --- | --- | --- |
| Sample 2 (comp.) | 1 (100/0) | Solution 3 | 271° C. | 53 (11) |
| Sample 11 (inv.) | (56/44) | Solution 3 | 325, 270 & 124° C. | 57 (8) |

As can be seen from table 3, besides some pure Bi (DSC peak at 270° C.) and Pb (DSC peak at 325° C.), a clear melting range, starting at 124° C., can be distinguished which corresponds to the melting range of a BiPb-alloy.

Example 3

This example demonstrates that the preparation of dispersed alloy nanoparticles is not limited to two component systems: alloys containing three or more metals can also be prepared.

The following solution was prepared:

| Solution 6 | |
| --- | --- |
| Water | 151 ml |
| $HNO_3$ (conc.) | 17 ml |
| Bi $(NO_3)_3 \cdot 5H_2O$ | 170 g |
| Triammonium citrate (50% in water) | 465 ml |
| $NH_3$ (26% in water) (pH = 12) | 122.7 ml |
| $SnCl_4 \cdot 5H_2O$ | 52 g |
| $In_2(SO_4)_3$ | 50 g |
| Water to | 2330 ml |

The sample was prepared as follows:

To solution 6, held at 40° C. and stirred at 450 rpm, solution 5 at a flow rate of 200 ml/min was added simultaneously with solution 3 at 117 ml/min. After the reduction, the Bismuth/Tin/Indium dispersion was ultrafiltrated through a Fresenius F60 cartridge and diafiltrated with a 0.2% solution of sodium hexametaphosphate in water/ethanol (98.5/1.5).

The dispersion was stirred and 10 ml of a 12.5% solution of Saponine Quillaya (Schmittmann) in water/ethanol (80/20) was added.

The dispersion was analysed for its particle size distribution with the Disc Centrifuge Photosedimentometer BROOKHAVEN BI-DCP ($d_{aw}$=19 nm and $S_{aw}$=10 nm).

Its melting traject was determined with the differential Scanning Calorimeter SEIKO SSC5200 DSC. According to the literature the alloy 58% Bi/26% Sn/16% In melts at 79° C. Although the DSC scan does not show a signal at 79° C., the following melting signals are observed: 86° C. (BiIn), 105° C. (BiIn), 147° C. (BiSnIn), 230° C. (Sn) and 270° C. (Bi).

What is claimed is:

1. Method for the formation of a heat mode image comprising information-wise exposing to laser radiation a heat mode recording element prepared by a method comprising coating a colloidal metal alloy composition onto a substrate, wherein the colloidal metal alloy composition is obtained by a process comprising steps as follows:
   (1) preparing an aqueous medium containing at least two different types of metal ions, each belonging to a group selected from groups IB, IIB, IIIA, IVA, and VA of the periodic system of elements,
   (2) chemically reducing said metal ions by a reducing agent.

2. Method according to claim 1 wherein said aqueous medium containing said at least two different types of metal ions is added simultaneously with a second aqueous medium containing said reducing agent into a third aqueous medium.

3. Method according to claim 1 wherein said reducing agent is present in molar excess vis-à-vis the total concentration of said at least two types of metal ions.

4. Method according to claim 1 wherein said process of obtaining said colloidal metal alloy composition further comprises an additional step (3) which is a washing step to remove all superfluous ions from said colloidal metal composition.

5. Method according to claim 4 wherein said washing step is an ultrafiltration and/or diafiltration step.

6. Method according to claim 1 wherein a protective binder is added in any stage of preparing said colloidal metal alloy composition.

7. Method according to claim 6 wherein said protective binder is carboxymethylcellulose.

8. Method according to claim 1 wherein a dispersing aid is added in any stage of preparing said colloidal metal alloy composition.

9. Method according to claim 8 wherein said dispersing aid is a hexametaphosphate.

10. Method according to claim 1 wherein said colloidal metal alloy consists of particles having an average particle size between 10 and 500 nm.

11. Method according to claim 1 wherein said at least two types of metal ions consist of bismuth ions and tin ions.

12. Method according to claim 1 wherein said at least two types of metal ions consist of bismuth ions and lead ions.

13. Method according to claim 1 is wherein said at least two types of metal ions consist of bismuth ions, tin ions and indium ions.

* * * * *

UNITED STATES PATENT AND TRADEMARK OFFICE
CERTIFICATE OF CORRECTION

PATENT NO. : 6,245,494 B1
DATED : June 12, 2001
INVENTOR(S) : Hieronymous Andriessen et al.

Page 1 of 1

It is certified that error appears in the above-identified patent and that said Letters Patent is hereby corrected as shown below:

Title page,
Item [30], Foreign Application Priority Data,
"Aug. 27, 1998 (NL)" should read
-- Aug. 27, 1998 (EP) --.

Column 2,
Line 34, "micro images" should read -- micro-images --.

Column 7,
Line 45, "a" should read -- $\alpha$ --.

Column 8,
Line 13, "2θapprox." should read -- $2\theta \cong$ approx. --.

Column 9,
Table 3, line 54, "Sample 2 (comp.) 1 (100/0)" should read -- Sample 2 (comp.) (100/0) --.

Column 10, claim 5,
Line 62, "washing step" should read -- washing step (3) --.

Signed and Sealed this

Fifteenth Day of January, 2002

Attest:

*Attesting Officer*

JAMES E. ROGAN
*Director of the United States Patent and Trademark Office*